United States Patent [19]

Bowers

[11] Patent Number: 4,587,422

[45] Date of Patent: May 6, 1986

[54] SUBSURFACE DENSITY TESTING METHOD

[76] Inventor: Craig R. Bowers, Rte. 6, Kirksville, Mo. 63501

[21] Appl. No.: 568,839

[22] Filed: Jan. 6, 1984

[51] Int. Cl.$^4$ .............................................. G01V 5/00
[52] U.S. Cl. ..................................... 250/253; 250/256
[58] Field of Search ....................... 250/253, 254, 256; 73/152; 340/853, 854, 856, 857, 861; 166/247, 250

[56] References Cited

U.S. PATENT DOCUMENTS

| | | | |
|---|---|---|---|
| 2,698,920 | 1/1955 | Gieske | 166/250 |
| 2,934,652 | 4/1960 | Caldwell | 250/269 |
| 3,202,822 | 8/1965 | Kehler | 250/269 |
| 3,798,455 | 3/1974 | Brafman | 250/269 |
| 3,849,646 | 11/1974 | McKinlay | 250/270 |
| 3,947,683 | 3/1976 | Schultz | 250/270 |
| 4,066,892 | 1/1978 | Givens | 250/262 |
| 4,442,701 | 4/1984 | Cowherd et al. | 73/32 R |

*Primary Examiner*—Janice A. Howell
*Attorney, Agent, or Firm*—Kokjer, Kircher, Bradley, Wharton, Bowman & Johnson

[57] ABSTRACT

A method for performing nuclear depth density tests in coal stockpiles and a special thin wall housing for the probe used in the tests. A drilling rig employs continuous flight augers to drill an access hole through the entire depth of the coal stockpiles. The nuclear density probe is inserted into the special housing. The housing is then screwed onto an initial section of drill pipe and an electrical cable extending from the probe is threaded through the drill pipe section. The winch line of the drilling rig is used to progressively lower the housing into the access hole. As the housing and probe are lowered, additional sections of drill pipe are added to the drill string and the electrical cable is fed through each added pipe section. When the housing reaches the bottom of the access hole, the cable is plugged into a scaler instrument located at the surface. Tests are performed at two foot intervals as the probe is progressively raised in the access hole by the winch line. The drill pipe sections are detached as they are raised out of the access hole, and the cable is pulled back through each detached pipe section and then reconnected to the scaler instrument.

20 Claims, 5 Drawing Figures

SUBSURFACE DENSITY TESTING METHOD

BACKGROUND OF THE INVENTION

This invention relates generally to the subsurface nuclear density testing of coal stockpiles and more particularly to an improved method of performing nuclear density tests. In other aspect, the invention relates to a thin walled tubular housing for the nuclear depth density probe used in performing the tests.

In order for electrical utilities to maintain proper control of their coal supplies, it is necessary for the utilities to obtain accurate information as to the amount of coal that remains in their coal stockpiles. The stockpile quantity in tons is normally estimated by obtaining through testing an average density value of the stockpile and multiplying this average density by the measured volume of the stockpile. The density value is obtained by a testing technique known as subsurface nuclear density testing.

Nuclear density testing is carried out with an instrument known as a nuclear depth density gauge which measures the subsurface wet density of the coal stockpile by using backscatter absorption of nuclear radiation. The instrument includes a subsurface probe having a source of radiation and a sensing element or detector which receives the backscattered radiation. A recording meter known as a scaler remains at the surface and is connected with the detector by a five wire electrical cable. Measurements are taken by lowering the probe through an access hole to the desired depth in the stockpile. Measurements are usually taken at preselected depth intervals such as every two feet throughout the entire depth of the coal stockpile so that an accurate measurement of the average density is obtained.

The nuclear depth density instrument measures the density of a spherically shaped volume centered at the probe. Gamma radiation is emitted at a constant average rate from the radiation source in the probe, and the gamma rays interact at the atomic level with the surrounding medium. Since the number of scattering events per unit time is a function of the density of the medium, the backscatter measurement sensed by the detector provides a measure of the density of the stockpile. By sampling and analyzing a sufficient quantity of the backscattered radiation within a fixed energy range and on a per unit time basis, a statistically significant measure is obtained of the relative degree of scatter of the material at different densities. The analysis is in effect performed by the detector. The use of materials of known densities permits quantification of the various degrees of scatter in terms of density. Pulses from the radiation detector are applied through the five wire cable to the scaler instrument which displays the density information on a liquid crystal display or another type of display.

In the past, subsurface density measurements have been performed by two different methods, both of which carry out testing a depth intervals of between two and two and a half feet. One method is known as the split spoon method. In the split spoon procedure, a relatively large diameter bore hole (typically 6-8 inches) is initially drilled to the first test depth using hollow stem augers. A device known as a split spoon sampler is then screwed onto the end of the drill string and lowered through the inside of the hollow stem augers to the bottom of the bore hole. The split spoon sampler is essentially a thick wall pipe having an outside wall diameter of two inches and a length of two feet. After being lowered to the bottom of the bore hole by the drill string, the split spoon sampler is driven approximately two feet into the coal stockpile by a pin hammer mechanism. The drill string and sampler are then withdrawn from the bore hole, leaving a pilot hole at the bottom. The sampler is detached from the drill string, and a thin wall insert tube (0.035 inch wall thickness) is attached to the end of the drill rod and lowered through the hollow stem augers. The insert tube is hydraulically pushed into the pilot hole. After the drill string has again been withdrawn, the nuclear depth density probe is lowered through the hollow stem augers into the insert tube. Testing is carried out with the insert tube serving as protective casing for the pilot hole into which the probe is lowered.

After each test has been performed, the nuclear depth density probe is withdrawn, the bore hole is advanced to the next test depth by the hollow stem augers, the split spoon sampler is lowered to the bottom of the hole and driven into the coal to provide another pilot hole, the sampler is removed, the insert tube is lowered and pushed into the pilot hole, the probe is lowered into the insert tube, and the next test is performed. This procedure is repeated at 2–2½ foot intervals until the entire depth of the coal stockpile has been tested.

Another and somewhat faster method of performing the density testing is referred to as the casing method. It involves first drilling an access hole through the entire depth of the coal stockpile using continuous flight augers. The access hole is cased by installing steel casing having an outside diameter of 2.25 inches (¼ inches smaller in diameter than the access hole) and an inside diameter of 2 inches. After the access hole has been cased from top to bottom, the nuclear depth density probe is lowered into the casing and testing is performed at 2 or 2½ foot intervals throughout the depth of the hole. When the testing has been completed, the probe is withdrawn, the casing is removed, and the process is repeated at the next test location.

As can easily be appreciated, the casing method is much less cumbersome and much quicker than the split spoon method, primarily because the split spoon method requires repeated lowering and raising of the drill string to manipulate the split spoon sampler and install and replace the insert tube. It has been found that the casing method takes on average approximately half as long as the split spoon method. During an eight hour working day, approximately 30 to 35 tests can be performed with the split spoon method, as contrasted with 60 to 70 tests with the casing method. This advantage of the casing method in speed is particularly significant in view of the high cost of labor and the high cost of operating drilling equipment.

However, the split spoon method provides much greater accuracy than the casing method. The greater accuracy is attributable to the thin wall of the insert tube (0.035 inch) in comparison to the relatively thich wall (0.125 inch) of the casing through which the radiation must pass in the casing method of testing. Since the amount of radiation which is able to enter the surrounding medium is greatly reduced with increasing wall thickness, the sensitivity of the nuclear depth density instrument is decreased when a thick wall must be penetrated. The variations in the density of the casing (such as where the casing sections are joined) also detract from the accuracy of the casing method, along with the unsymmetrical nature of the generally annular gap formed between the casing and the bore hole. Accordingly, the accuracy that is obtained from the thin wall split spoon method gives it a significant advantage over the thick wall casing method of testing. The need to use hollow stem augers in the split spoon procedure is a disadvantage which is substantially offset by the need to case the entire depth of the access hole in the casing method.

SUMMARY OF THE INVENTION

The present invention is directed to an improved method of performing subsurface nuclear density testing of coal stockpiles and has, as its principal goal, the provision of a new testing procedure which combines the advantages of the split spoon and casing methods. More specifically, it is an important object of the invention to provide a subsurface nuclear density testing method which achieves the accuracy of the split spoon method and the speed of the casing method. Another object of the invention is to provide a testing procedure which requires neither the hollow stem augers that are needed in the split spoon testing process nor the thick walled casing that is needed in the casing method. A further object of the invention is to provide a special thin walled housing for the nuclear density probe so that accurate test results can be obtained with the probe adequately protected.

In accordance with the invention, a special thin walled housing is provided for the nuclear depth density probe. A test hole is drilled to its final depth with continuous flight augers which are then withdrawn. The probe is inserted into the special tubular housing, and the housing is screwed onto a drill pipe with the five wire electrical cable fed through the inside of the drill pipe. The housing and probe are progressively lowered into the hole by the drilling rig, and additional sections of drill pipe are added in succession. The electrical cable is fed through each pipe section that is added to the drill string. When the housing has been lowered to the bottom of the access hole, the cable is plugged into the scaler unit at the surface. The drilling rig then progressively raises the drill string, and testing is performed at two or two and a half foot intervals throughout the entire depth of the access hole. As the drill pipe sections are raised out of the access hole, they are detached in succession from the drill string, and the electrical cable is disconnected from the scaler and pulled back through each detached pipe section before being reconnected to the scaler instrument to permit testing to resume. Eventually, the probe is raised to the surface after all of the tests have been completed.

The special thin walled tubular housing which encloses the nuclear density probe during the testing operation adequately protects the probe and eliminates the need to case the access hole. At the same time, the special housing is as thin as the insert tube that is used in the split spoon method. Consequently, the accuracy of the split spoon method is achieved with the speed and efficiency of the casing method. Also, there is no need for hollow stem augers or extensive lengths of thick walled steel casing.

DETAILED DESCRIPTION OF THE INVENTION

In the accompanying drawings which form a part of the specification and are to be read in conjunction therewith and in which like reference numerals are used to indicate like parts in the various views.

Figure 4:
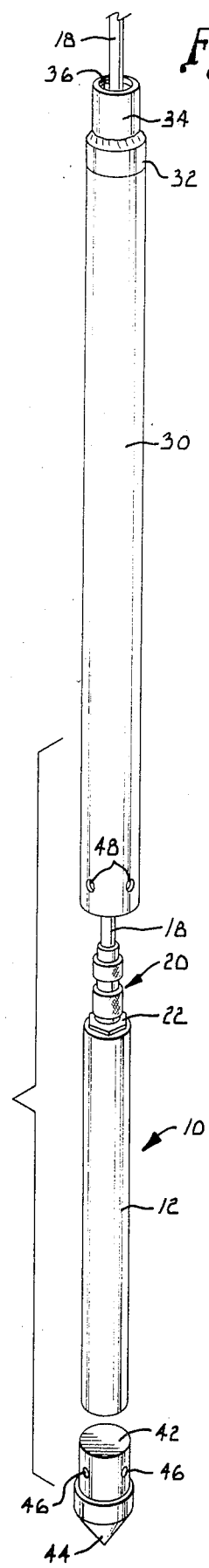
FIG. 4 is an exploded perspective view of the special housing, showing the manner in which it receives the nuclear depth density probe.
Figure 5:
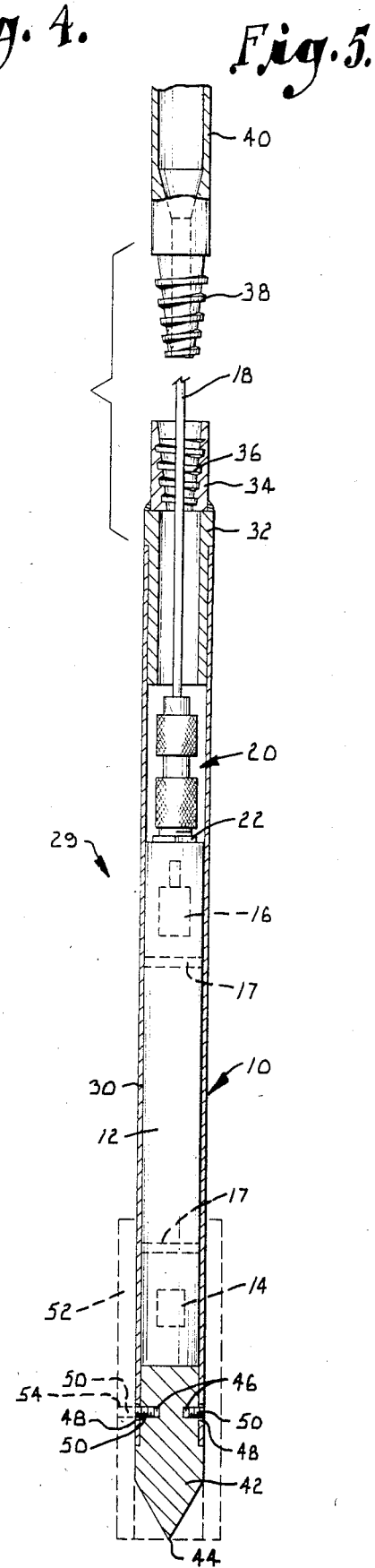
FIG. 5 is a sectional view showing the probe inserted into the assembled housing, with the housing about to be screwed onto a drill pipe section shown only fragmentarily.

Referring now to the drawings in detail and initially to FIGS. 4 and 5, the improved density testing method of the present invention uses a nuclear depth density gauge having a probe generally designated by numeral 10. The probe is a conventional device that has long been used in the nuclear density testing of coal stockpiles and other materials. By way of example, the depth density gauge may be a Model 1351 available from Troxler Electronic Laboratories, Inc.

The probe 10 includes a tube 12 having an outside diameter of approximately 1.865 inches and a length of approximately 18 inches. The tube is capped at both its upper and lower ends. A radiation source 14 is mounted within the lower portion of tube 12, and a radiation detector 16 is located within the upper portion of the tube. Radiation shielding 17 is located between the source 14 and detector 16. Extending from the upper end of the probe 10 is a five wire electrical cable 18 which connects at one end with the detector 16. An electrical plug 20 makes electrical connection between the cable 18 and the probe 10. The plug screws onto a connector which projects from the top of the probe and which connects via four wires with the preamp board located immediately beneath it on top of the radiation detector. A nut 22 is screwed onto the connector to secure it on the probe. A set screw (not shown) prevents the plug 20 from unscrewing from the connector. The electrical cable 18 is an elongate flexible cable which can have virtually any desired length. On the end opposite probe 10, the cable is provided with a special four prong electrical plug 24 (see FIGS. 2 and 3) having a relatively small diameter of approximately $\frac{5}{8}$ inch.

Figure 2:
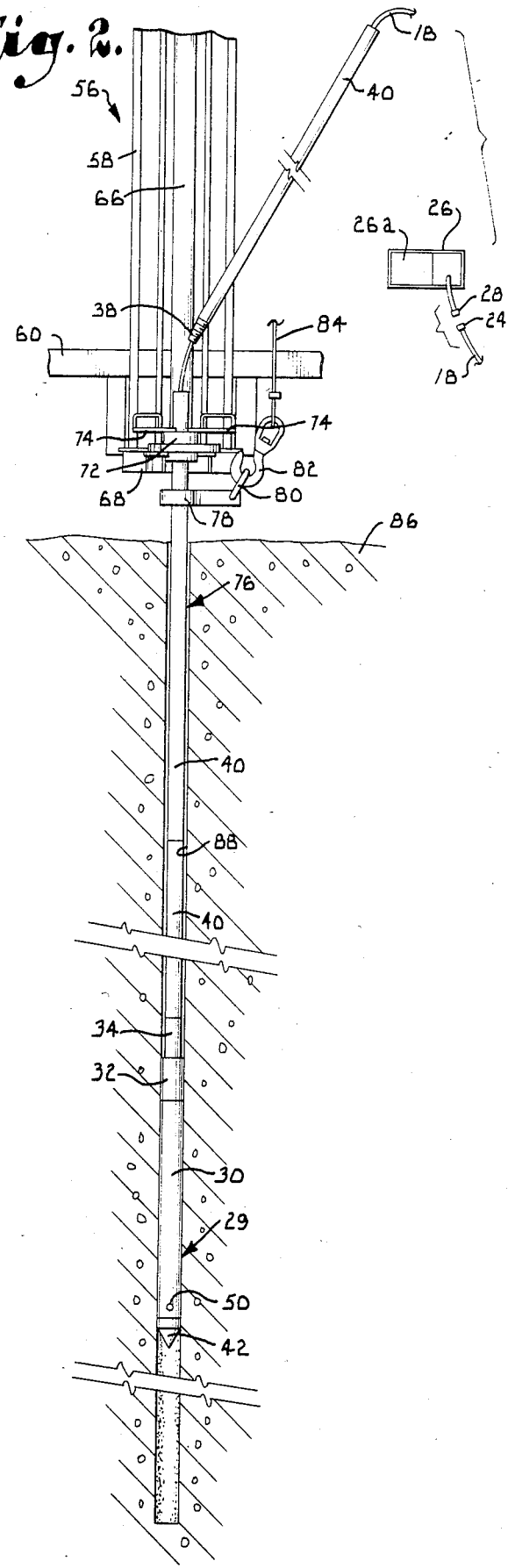
FIG. 2 is a fragmentary elevational view showing the special housing of the present invention attached to a drill string which is being lowered into the access hole, with the electrical cable fed through a drill pipe section which is being added onto the drill string.
Figure 3:
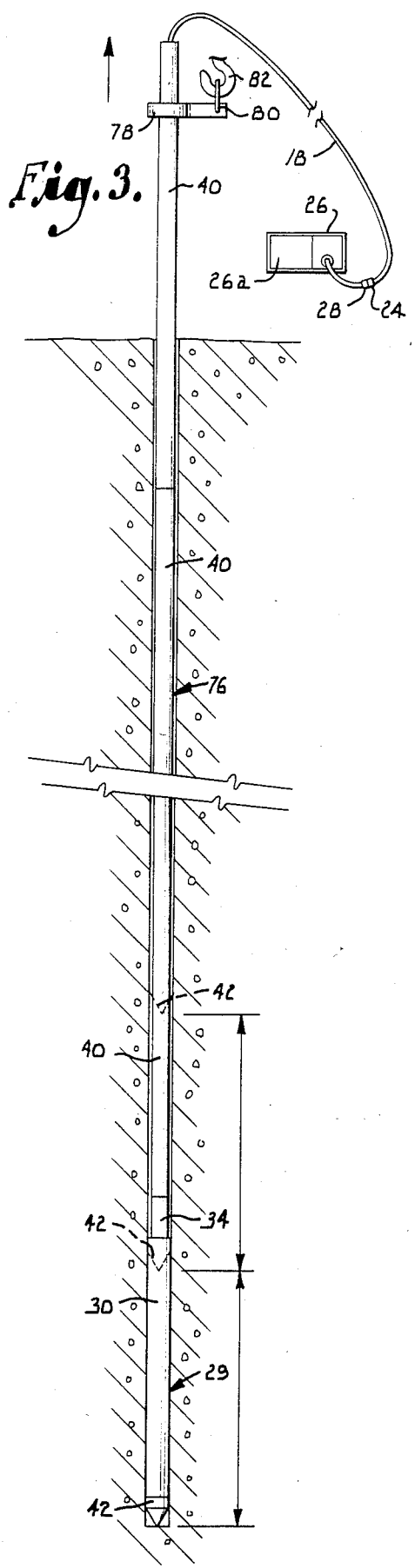
FIG. 3 is an elevational view showing the drill string fully lowered to locate the special housing on the bottom of the access hole, with the electrical cable plugged into the surface scaler instrument.

With continued reference to FIGS. 2 and 3 in particular, the nuclear depth density gauge includes a scaler instrument 26 located at the surface. The scaler instrument 26 is a conventional instrument which may be a Model 2601 scaler available from Troxler Electronic Laboratories, Inc. The scaler has an LCD read out panel 26a which displays the measured density information provided to it as electrical pulses from the radiation detector 16 located in the probe 10. Pulses from the detector 16 are transmitted along the electrical cable 18 to the scaler. The scaler has a receptacle 28 which receives the special plug 24 on the end of cable 18. The plug 24 can be quickly and easily plugged into and detached from the receptacle 28.

Referring again to FIGS. 4 and 5 in particular, a special housing 29 provided for the probe 10. The housing 29 includes a thin walled carbon steel tube 30 having a length of approximately 26 inches. The outside diameter of tube 30 is 2 inches and the inside diameter is 1.93 inches, giving the tube a wall thickness of 0.035 inch. Since the probe 10 has an outside diameter of 1.865 inches, it fits easily although rather closely in the housing tube 30.

The upper end of the thin walled tube 30 receives a thick walled transition tube 32. Tube 32 has a wall thickness of approximately 0.5 inch. A lower portion of the tube 32 fits closely inside of the upper end of tube 30, while the upper portion of tube 32 is located exteriorly of tube 30 and essentially forms an extension thereof. The transition tube 32 is welded to the housing tube 30.

An AWML sub fitting 34 is welded or otherwise secured to the upper end of the transition tube 32. The sub fitting 34 provides a continuation of the housing 29 and is provided with tapered internal threads 36 in order to receive the external threads 38 formed on one end of a section of drill rod or pipe 40 (see FIG. 5). The tapered external threads 38 are formed on one end of the drill rod, and the other end has tapered internal threads similar to the threads 36 on the sub fitting, thus permitting the sections of drill pipe to be screwed together end to end to form a drill string. The drill pipe 40 may be a standard size drill rod having an outside diameter of 1.75 inches and an inside diameter of 1.375 inches. The inside diameter of each end of the drill pipe section is approximately ⅝ inch to accommodate the special plug 24. The pipe sections 40 may be either 5 or 10 feet long.

The lower end of the thin walled housing tube 30 is equipped with a detachable end plug 42. The plug 42 is a solid metal member which fits partially into the lower end of tube 30 and which preferably includes a pointed tip 44 located below the lower end of tube 30. The plug 42 has four equally spaced screw passages 46 which are internally threaded. Four equally spaced screw openings 48 are formed through tube 30 slightly above its lower end and can be aligned with the screw passages 46. The plug 42 can be secured in place to close the lower end of tube 30 by threading screws 50 through openings 48 and into passages 46. The plug can be detached by removing the screws 50 and withdrawing the plug from the end of tube 30.

As shown in broken lines in FIG. 5, a radiation shield 52 is formed by a thick walled steel pipe having an inside diameter substantially equal to the outside diameter of tube 30. The shield 52 can be slipped over the lower end of the assembled housing and can be temporarily secured in place by one of the screws 50. For this purpose, the shield 52 is provied with an opening 54 through which the screw 50 can be extended. When in place on the tube 30, the radiation shield 52 encloses the radiation source 14 located in the probe 10.

Figure 1:
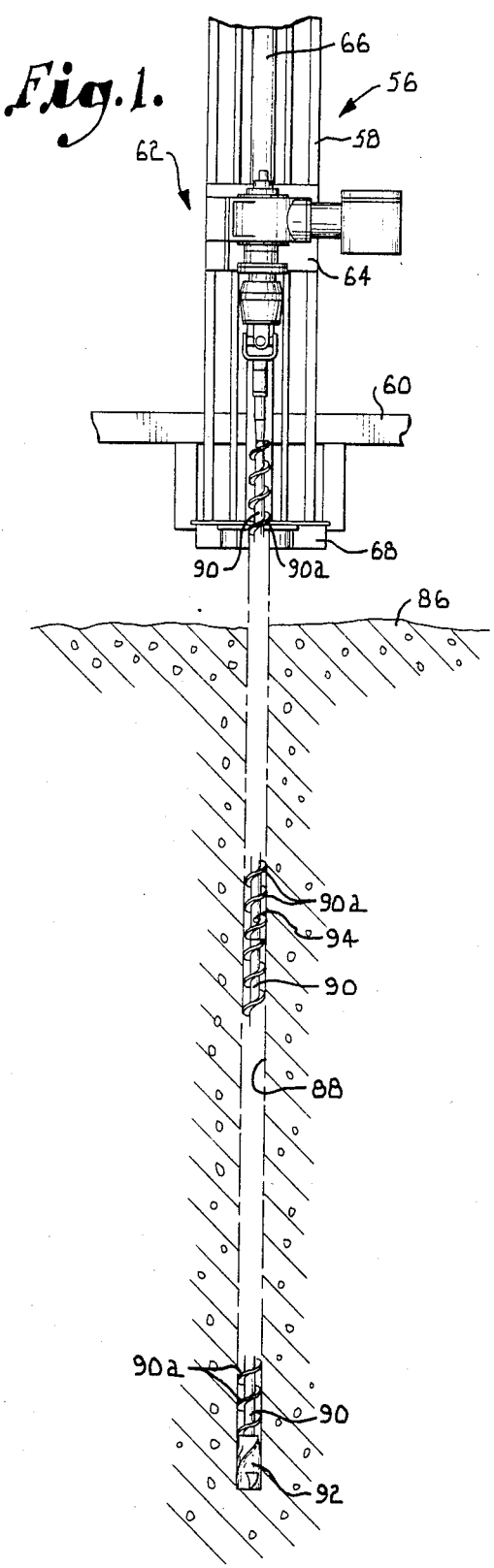
FIG. 1 is a fragmentary elevational view showing a drilling rig equipped with continuous flight engines that are used to drill an access hole in accordance with the method of the present invention.

Referring now more particularly to FIGS. 1 and 2, the method of the present invention utilizes a conventional mobile drilling rig 56 which may be of the type mounted on the back end of a truck (not shown). The drilling rig 56 includes an upright frame 58 mounted on the frame 60 of the truck. A drilling head 62 is mounted on a plate 64 which can be moved up and down on a vertical guide post 66 forming part of the frame of the drilling rig.

The drilling equipment also includes a C-shaped support plate 68 for supporting a removable drill rod spider 72 (FIG. 2). The spider 72 is a conventional device which includes a pair of lever operated jaws 74 that can be closed to grip the drill string 76 formed by a series of individual drill pipe sections 40 connected end to end. A collar 78 equipped with a ring 80 is used to handle the drill pipe sections 40. The ring receives a hook 82 secured to the end of the winch cable 84 of the drilling rig. A connectional winch (not shown) located in the bed of the truck pays out and winds in the winch cable 84.

In carrying out the subsurface nuclear density testing method of the present invention, the first step is to locate the drilling rig 56 at the desired test location of the coal stockpile 86 which is to be tested. The drilling rig is used to drill an access hole 88 through the full depth of the coal stockpile 86. The access hole 88 is an uncased hole which provides access to the various depths of the coal stockpile at which testing is to be performed. Preferably, the access hole 88 is drilled by using two inch outer diameter solid, continuous flight augers 90. Each auger section is five feet long, and the auger sections are successively connected end to end as the drilling progresses.

It has been found that the use of a fish tail bit 92 on the lead auger section 90 provides easy drilling. If desired, coal samples can be obtained at various depths by periodically withdrawing the auger string from the access hole and obtaining samples from the spiral auger flights 90a. During drilling, the successive auger sections 90 are connected by drive pins such as the pin indicated at 94. When the access hole 88 has been drilled completely through the coal stockpile 86, the auger string is withdrawn and disconnected from the drilling head 62.

After the access hole 88 has been completed and the augers 90 have been withdrawn, the nuclear density gauge is prepared for testing. The probe 10 is normally located within a shield (not shown) from which the probe is intended to be lowered during testing. In accordance with the present invention, the probe 10 is removed from its shield and placed in the housing tube 30. This is accomplished by removing the screws 50 so that the end plug 42 can be removed. The electrical cable 18 is threaded through tube 30 from the lower end to the upper end, and the probe 10 is inserted into tube 30 from the open lower end. After the probe has been inserted into tube 30, the end plug 42 is replaced and secured by fastening it with the screws 50. The radiation shield 52 is then sleeved over the lower end of tube 30 and temporarily secured by one of the screws 50.

Next, the electrical cable 18 which extends out of the sub fitting 34 is fed or threaded through the inside of the initial drill pipe section 40. As the slack in the cable is taken up, the sub fitting 34 is threaded onto the externally threaded end 38 of the drill pipe to secure the special housing on the drill pipe. The collar 78 is fitted on the pipe section 40, and the radiation shield 52 is removed before the tube 30 and drill pipe section 40 are lowered into the access hole 88 by the winch cable 84 of the drilling rig. When only the upper end of the drill pipe 40 extends out of the access hole, the drill rod spider 72 is placed on the support plate 68, and the jaws 74 are closed on the upper end portion of the drill pipe to hold it in place. The cable 18 is then fed through the inside of the second drill pipe section 40, and once the slack is taken up, the second section is screwed onto the first pipe section to connect the two drill pipe sections end to end with the electrical cable extending through both of the pipe sections.

The winch cable 84 of the drilling rig is then used to lower the drill string an additional distance of approximately 5 to 10 feet (the length of the added drill pipe section 40). The top end of the drill string is then gripped by the spider 72, the cable 18 is threaded through an additional pipe section 40, and the additional pipe section is screwed onto the top of the drill string 76. This procedure is repeated and additional pipe sections 40 are added onto the drill string until the housing tube 30 and the enclosed probe 10 reach the bottom of the access hole 88. The electrical cable 18 then extends through the entirety of the drill string 76, and plug 24 is inserted into receptacle 28 to electrically connect the subsurface probe 10 with the scaler instrument 26 so that testing can begin.

Preferably, tests are performed at 2 foot intervals along the entire depth of the access hole 88. Each test involves the emission of radiation from the radiation source 14 and the receipt and detection of the backscattered gamma rays by the detector 16. Electrical pulses indicative of the density of the coal surrounding probe 10 are applied by the detector 16 to the scaler unit 26 along cable 18, and the scaler provides a display of the test results on the panel 26a.

After the test has been completed at each depth, the winch cable 84 is used to raise the drill string 76 an additional 2 feet to the next test depth. Each time one of the drill pipe sections 40 is raised out of the access hole 88, the electrical cable 18 is unplugged from the scaler unit 26, the pipe section 40 is unscrewed from the underlying section to remove it from the drill string, and the electrical cable is pulled back through the disconnected pipe section 40. The electrical cable is then reconnected to the scaler unit by connecting plug 24 to receptacle 28 so that testing can be resumed.

In this manner, the drill pipe sections are removed from the drill string in succession in an order reverse from their order of attachment. Eventually, the housing tube 30 and probe 10 are raised to the surface as the last drill pipe section 40 is pulled out of the access hole. The sub fitting 34 is then unscrewed from the drill pipe section, and the radiation shield 52 is again attached to the special housing. The drilling rig and all of the other equipment can then be moved to the next location at which testing is to be performed on the coal stockpile 86.

Each test that is performed provides density information to the scaler instrument 26, and all of the test data can be compiled to provide a value for the average density of the coal stockpile 86. By multiplying the average density by the measured volume of the stockpile, an accurate estimate of the quantity in the stockpile in tons can be obtained. At the end of all testing, the probe 10 can be removed from its housing 29 by detaching the end plug 42, withdrawing the probe and the attached cable 18 through the lower end of tube 30, and placing the probe in its shield (not shown).

It should be understood that the testing can be performed at 2 foot intervals as the probe 10 is progressively lowered into the access hole 88, rather than as the probe is progressively raised. In either case, the testing process can be carried out at a speed comparable to that achieved by the casing method of testing. Equally important, the housing tube 30 has a wall thickness of only 0.035 inch which is identical to that of the insert tube used in the split spoon method of testing. Accordingly, the accuracy of the measurements obtained by the method of the present invention compares favorably with that obtained by the split spoon method. It is noteworthy that the method of the present invention does not require the use of hollow stem augers such as are required by the split spoon method or a large number of casing pipe sections such as are required by the casing method.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A subsurface density testing method for use in calculating the quantity of coal in a coal stockpile, said method comprising the steps of:
   drilling an uncased access hole in the stockpile to a preselected depth;
   providing a nuclear depth density probe having an elongate flexible electrical cable extending therefrom;
   inserting said probe into a thin walled protective tube with the electrical cable extending through an open end of the tube;
   threading said cable through a first pipe section having a smaller diameter than the access hole;
   securing said protective tube to the first pipe section;
   lowering the first pipe section into the access hole to lower the probe into the hole;
   threading said electrical cable successively through additional pipe sections each having a smaller diameter than the access hole, securing the pipe sections together end to end in succession to form a pipe string, and progressively lowering the pipe string into the access hole to progressively lower the probe; and
   successively performing density tests with the probe at a plurality of different depths within the access hole with said electrical cable connected to a recording instrument located at the surface each time a density test is performed to record the measurements resulting from each test.

2. The method of claim 1, wherein said tube has an outside diameter substantially equal to the diameter of the access hole.

3. The method of claim 1, wherein the step of securing said protective tube to the first pipe section comprises screwing the tube and first pipe section together.

4. The method of claim 3, wherein the steps of securing the pipe sections together end to end comprises screwing the pipe sections together.

5. The method of claim 1, wherein the step of successively performing density tests with the probe comprises raising the pipe string to raise the probe a preselected amount between each test and the successive test.

6. The method of claim 5, including the steps of:

disconnecting the electrical cable from the recording instrument each time a pipe section is raised out of the access hole;

disconnecting each pipe section from the pipe string when the section is raised out of the access hole;

pulling the disconnected cable through each disconnected pipe section; and reconnecting the cable to the recording instrument prior to performance of the next density test, whereby the pipe string is disassembled and the probe is raised to the surface after all of the density tests have been performed.

7. The method of claim 1, wherein said inserting step comprises:

threading the electrical cable through the protective tube from the end thereof opposite said open end;

inserting the probe into said tube through said opposite end thereof; and thereafter closing said opposite end of the tube.

8. A subsurface density testing method for use in calculating the quantity of coal in a coal stockpile, said method comprising the steps of:

drilling an uncased access hole in the stockpile to a preselected depth with a drilling rig;

providing a nuclear depth density probe having one end of an elongate electrical cable connected therewith;

providing a thin walled metal protective tube having an outside diameter substantially equal to the diameter of the access hole and an inside diameter sufficient to receive the probe;

inserting said probe into said tube with the electrical cable extending from the tube;

threading said cable through a first drill pipe section having a smaller diameter than the access hole;

securing said tube to the lower end of said first drill pipe section;

using the drilling rig to lower the first drill pipe section into the access hole;

threading said cable successively through additional drill pipe sections each having a smaller diameter than the access hole, effecting successive end to end connections of the drill pipe sections to form a drill string, and using the drilling rig to progressively lower the drill string into the access hole following each end to end connection of the drill pipe sections until said protective tube reaches the bottom of the access hole;

connecting the electrical cable to a recording instrument located at the surface;

using the drilling rig to raise the drill string in successive increments;

successively performing density tests with said probe at a plurality of different depths as the probe is raised within the access hole;

disconnecting the electrical cable from the recording instrument each time a drill pipe section is raised out of the access hole;

disconnecting each drill pipe section from the drill string when the section is raised out of the access hole;

pulling the electrical cable through each drill pipe section after same has been raised out of the access hole and disconnected from the drill string; and reconnecting the electrical cable to the recording instrument.

9. The method of claim 8, wherein the step of securing said tube to the lower end of said first drill pipe section comprises screwing the tube and first drill pipe section together end to end.

10. The method of claim 9, wherein the steps of effecting successive end to end connections of the drill pipe sections comprises screwing the drill pipe sections together end to end.

11. The method of claim 8, including the steps of:

disconnecting the electrical cable from the recording instrument when said first drill pipe section is raised out of the access hole;

disconnecting the first drill pipe section from said protective tube when the first drill pipe section is raised out of the access hole; and pulling the cable through said first drill pipe section after same has been disconnected from the tube.

12. The method of claim 11, including the step of removing the probe from said tube after the cable has been pulled through the first drill pipe section.

13. The method of claim 11, including the step of applying a radiation shield to the probe after same has been raised out of the access hole.

14. The method of claim 8, wherein said inserting step comprises:

threading the cable through said tube from a first end thereof to a second end thereof; inserting the probe into the tube through said first end thereof; and closing said first end of the tube to retain the probe therein.

15. A protective housing for a nuclear depth density probe having a housing tube capped at opposite ends and an electrical cable extending from the housing tube, said housing comprising:

a thin walled metal tube having upper and lower ends and an inside diameter sufficient to closely accommodate the housing tube of the probe therein;

a removable end plug for the lower end of said metal tube;

means for detachably securing said end plug on said lower end of the metal tube to close said metal tube on the lower end thereof, said probe being insertable into said metal tube through the lower end thereof when said end plug is removed from the metal tube and said probe being enclosed within said metal tube when the end plug is secured on said lower end of the metal tube; and thread means on said upper end of the metal tube for detachable threaded attachment to a pipe section with the electrical cable extending through said upper end of the tube and through the pipe section.

16. The invention of claim 15, wherein said detachable securing means comprises a plurality of removable fasteners for detachably fastening said end plug to said metal tube.

17. The invention of claim 15, including:

a thick walled pipe forming a radiation shield; and means for detachably securing said thick walled pipe on said metal tube to enclose at least a portion thereof.

18. The invention of claim 15, including:

a transition tube secured to said upper end of said metal tube, said transition tube having a first portion extending within said upper end of the metal tube and a second portion located exteriorly of the metal tube; and a hollow sub fitting secured to said second portion of the transition tube, said sub fitting providing said thread means thereon.

19. The invention of claim 18, wherein said thread means comprises a plurality of internal screw threads formed in said sub fitting.

20. The invention of claim 18, wherein said detachable securing means comprises a plurality of removable fasteners for detachably fastening said end plug to said metal tube.

* * * * *